United States Patent [19]

Shifflett

[11] Patent Number: 4,835,900
[45] Date of Patent: Jun. 6, 1989

[54] MULTI-PURPOSE PEST TRAP

[76] Inventor: Shirley W. Shifflett, P.O. Box 23155 - Bluegrass Station, Lexington, Ky. 40523

[21] Appl. No.: 155,491

[22] Filed: Feb. 12, 1988

[51] Int. Cl.$^4$ ............................................. A01M 23/04
[52] U.S. Cl. .......................................... 43/58; 61/64; 61/67
[58] Field of Search .................. 43/58, 107, 124, 112, 43/61, 64, 67

[56] References Cited

U.S. PATENT DOCUMENTS

| | | | |
|---|---|---|---|
| 645,880 | 3/1900 | Varnum | 43/107 |
| 2,549,080 | 4/1951 | Grossi | 43/67 |
| 4,062,142 | 12/1977 | Marotti | 43/61 |
| 4,138,796 | 2/1979 | Souza | 43/67 |
| 4,144,668 | 3/1979 | Darncharnjitt | 43/107 |
| 4,596,087 | 6/1986 | Pratscher | 43/64 |
| 4,741,121 | 5/1988 | Pratscher | 43/58 |

*Primary Examiner*—Kurt Rowan
*Attorney, Agent, or Firm*—Warren D. Flackbert

[57] ABSTRACT

A multi-purpose pest trap characterized by a container including a rodent trap portion and a bug trap portion. The passage of the rodent into the rodent trap portion towards a bait supply interrupts a photoelectric beam and causes the entry to the rodent trap portion to be closed. Thereafter, a movable partition defining a gas chamber is closed, where the rodent is then effectively eradicated by a gas discharge. In the bug trap portion, a pivotal chute directs the bug onto a rotatable brush disposed within a gas chamber. The aforesaid chute pivots and the brush rotates upon the interruption of a photoelectric beam when a bug is at a bait location. Again, gas discharge serves bug eradication.

5 Claims, 1 Drawing Sheet

MULTI-PURPOSE PEST TRAP

As is known, the need for the adequate control of rodents, such as mice, and of bugs, such as the common roach, is widespread. While various approaches are available, a large amount of such are deficient in operation for one reason or another. The available trap mechanisms are manyfold, ranging, for example, from a common mousetrap and/or bug button to more sophisticated structures.

The invention serves a significant need in trapping rodents and bugs, generally employing, together with appropriate bait, the use of photo electric cells for sensing the presence of the rodent and/or the bug in the trapping areas. While the invention is directed to a combined rodent and bug trap, the individual functions can be separated, i.e. performed by independent units; however, a combination trap has certain advantages, including, by way of example, the conservation of floor space; the use of a common power source; the ease in locating, for use, a single unit in contrast to separate units; and, the like.

In any event, a better understanding of the present invention will become more apparent from the following description, taken in conjunction with the accompanying drawing, wherein

Figures 1, 2, 3:
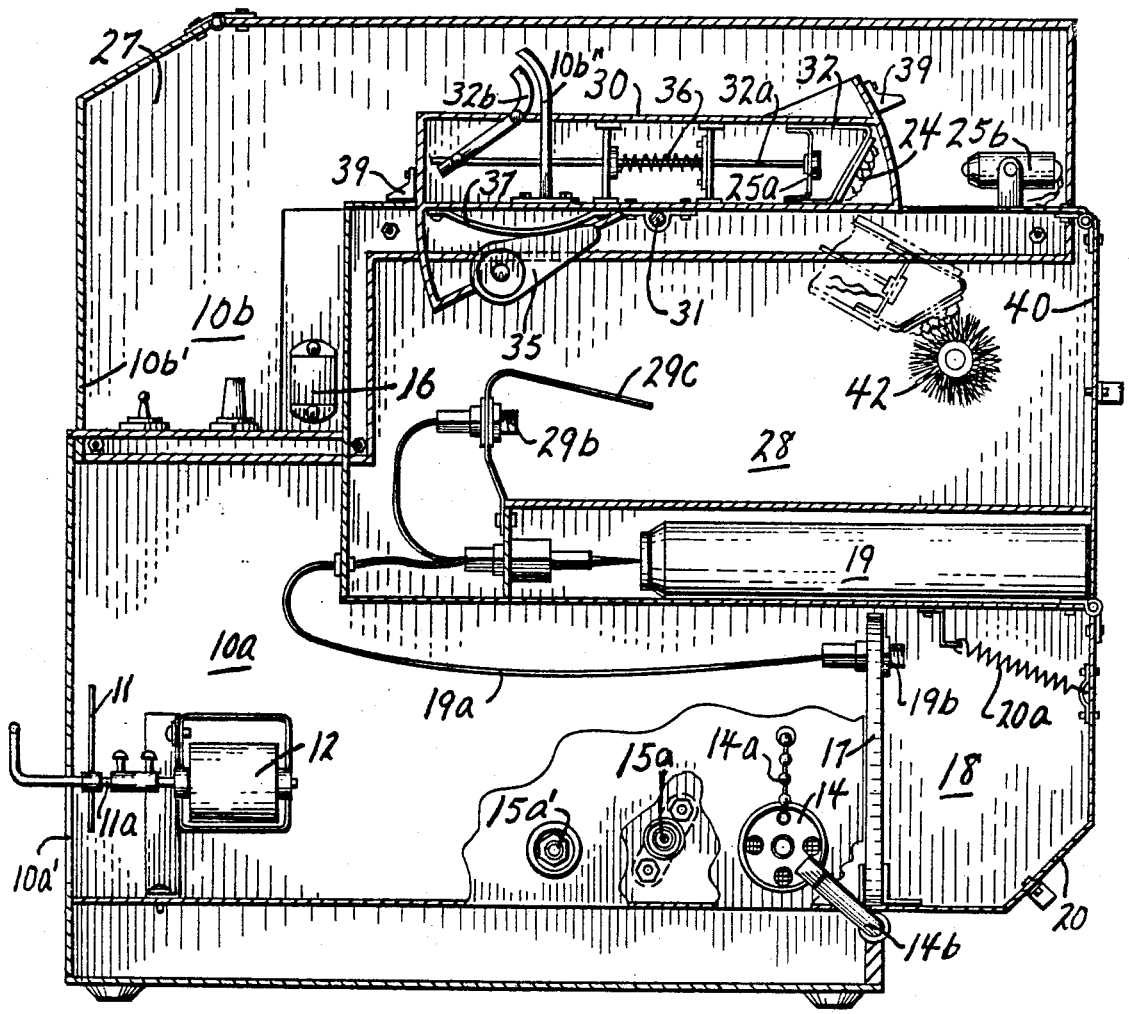
FIG. 1 is a view in side elevation, partly fragmentary, showing a multi-purpose pest trap in accordance with the teachings of the present invention.
FIG. 2 is a view in front elevation, looking from left to right in FIG. 1, detailing the trap of the invention; and, FIG. 3 is a view in rear elevation, looking from right to left in FIG. 1, still further detailing the trap of the invention.

For the purposes of promoting an understanding of the principles of the invention, reference will now be made to the embodiment illustrated in the drawing and specific language will be used to describe the same. It will nevertheless be understood that no limitations of the scope of the invention is thereby intended, such alterations and further modifications in the illustrated devices, and such further applications of the principles of the invention as illustrated therein being contemplated as would normally occur to one skilled in the art to which the invention relates.

Referring now to the figures, the multi-purpose pest trap of the invention includes a container 10 divisible into a lower rodent trap portion 10a and an upper bug trap portion 10b. Considering first the former, the rodent trap portion 10a includes, for rodent entry, and typically, an inlet or port 10a in a wall thereof (see FIG. 1). A door 11, mounted on a shaft 11a operated by an electric motor 12, serves to selectively cover the inlet or port 10a', and to thereby block any rodent escape from trap portion 10a.

The rodent is attracted to enter portion 10a by the presence of bait in a holder 14, typically carrying cheese or a like edible product, with the holder 14 being secured in position by a chain 14a and clip 14b arrangement. Since the bait holder 14 is spaced relatively distant from inlet 10a', unwanted rodent escape is further minimized.

In any event, as the rodent passes toward the bait, a beam passing from a light source 15b to a photocell 15a (mounted, at 15a', onto a plate on a side wall of the rodent trap portion 10a) is broken, energizing the motor 12 which closes door 11 (from a normally open position). At the same time, an audible alarm 16 sounds, i.e. when door 11 is closed. The rodent is now contained within trap portion 10a. A slidable partition 17, moved by a handle 17a, permits rodent entry and/or movement into a gas chamber 18.

The gas for the latter is stored in a cylinder 19 which communicates, through conduit 19a, to discharge port 19b (mounted on slidable partition 17). When gas is released, the rodent expires, where the remains can be withdrawn through door 20, which by reason of spring 20a, is normally urged into a closed position.

As to the upper bug trap portion 10b, and remembering that bugs, such as roaches, are attracted to bait and, as well, to other bugs, the primary concern is to accumulate the entering, through an opening (not shown) in lid 10b', bugs at a single location, where, in this instance, such is gas chamber 28. In this connection, the needed gas is stored in a cylinder 29 (side-by-side with cylinder 19, as evident in FIG. 3) and passes through conduit 29a to a discharge port 29b mounted, together with deflector 29c, within the gas chamber 28.

Disposed above the gas chamber 28, and in a cut-out in the top wall thereof, and within a spaced (for added bug passage) dust cover 27, is an open-ended chute 30 which rotates, at pivot 31, in response to cam 35 movement (in a counter-clockwise direction in FIG. 1). The cam 35 bears against an arcuate member 37 disposed on the undersurface of chute 30, where stops 39 are provided to limit pivotal movement of the latter.

The bug trap portion 10b further includes an operatively combined photocell 25a and pivotal light source 25b (also see FIG. 3) which, when interrupted by the presence of a bug, causes cam 35 rotation through energization of a power source (not shown), and the movement of the chute 30 from the solid line to the broken line positions of FIG. 1. The photocell 25a-light source 25b may also include a magnifier (not shown) for better and/or more sensitive bug detection.

In this connection, a clip-on bait holder 24, in the form of a plate, is provided at the end of chute 30, being mounted on a slide assembly 32 movable within the chute 30. A central area in the holder 24 is void of bait and provides a path of travel for the light from source 25b to the photocell 25a.

When the light path is broken by bug movement on the surface of the bait holder 24, chute 30 pivots, as stated. The bait holder 24, with the bug(s) thereon, moves into contact with a rotatable brush 42 (operable in a counter-clockwise direction—in FIG. 1) due to the pushing of an ejector plunger shaft 32a of the slide assembly 32, i.e. against the normal force of a seated spring 36 encircling the plunger shaft 32a.

The latter is accomplished through cooperative reaction between an inverted U-shaped fixed member 10b" secured onto the top of the housing 10b (see FIG. 2) and a pivotal linkage member 32b interconnecting the plunger shaft 32a and the top wall of the chute 30 (in a bearing). In other words, as the pivotal linkage member 32b moves due to the pivoting of the chute 30, plunger shaft 32a and the slide assembly 32 moves to the right in FIG. 1 (against the force of spring 36).

The preceding causes the removal of the bug, by the brush 42, from the bait holder 24 and into the gas chamber 28. Thus, forward movement of the bait holder 24 into contact with the brush 42 accomplishes bug removal. When enough bugs are accumulated, eradication can be initiated, i.e. by the release of gas into the gas chamber 28. Bug removal is accomplished through pivotal end door 40.

The mechanism further includes (although not detailed) a compartment 45, typically beneath the lower rodent trap portion 10a of container 10, for power/battery placement, relay storage and conventional AC-DC plug-in purposes. Moreover, various switching and/or controls 47 (not detailed) are included for selective mode functioning.

From the preceding, it should be apparent that the invention presents a multi-purpose pest trap which is effective in operation and, as such is typically made from Plexiglas or like clear material, permits visual location of the involved rodents and bugs. In other words, after trapping has been accomplished, the operator can simply release the gas feeding into the appropriate chamber or chambers by the use of hand controls. The fact that both rodents and bugs can be trapped in a single case and/or container 10 provides versatility in use and/or placement. The effective use of photocell arrangements is significant to the operational sequence, both as to rodents and bugs.

The multi-purpose pest trap described hereabove is susceptible to various changes within the spirit of the invention, including, by way of example, in proportioning; the particular rodent door arrangement employed; the type of bait presented, both for the rodent and the bugs; the precise positioning of the brush; and, the like. Thus, the preceding should be considered illustrative and not as limiting the scope of the following claims:

I claim:

1. A multi-purpose pest trap comprising a container having a rodent receiving portion and a bug receiving portion, each of said portions including a gas chamber, bait, photoelectric means selectively serving to confine movement of the pest within said container, a source of gas, and means discharging gas from said source into said gas chamber, where said bug receiving portion includes a bug attracting chute assembly pivotally responsive to said photoelectric means, and where a rotatable brush within said gas chamber selectively releases a bug upon pivotal engagement by said chute assembly.

2. The multi-purpose pest trap of claim 1 where said rodent receiving portion includes a rodent entry, and where said photoelectric means selectively operates a closure for said rodent entry.

3. A pest trap comprising a container including a bug entry, a pivotal chute mounted on said container receiving a selectively slidable ejector means, a bait member secured to one end of said slidable ejector means, a photoelectric beam passing through a portion of said bait member and responsive to movement of said bug for initiating pivoting of said chute and moving said slidable ejector means in an engaging relationship with a rotatable brush disposed within a gas chamber, a source of gas, and means discharging gas from said source into said gas chamber.

4. The pest trap of claim 3 where the interruption of said photoelectric beam controls the pivoting of said chute and the rotation of said brush.

5. The pest trap of claim 3 where said pivoting of said chute and said movement of said slidable ejector means into said engaging relationship with said rotatable brush is cam responsive.

* * * * *